United States Patent
Olver (10) Patent No.: US 7,862,293 B2
(45) Date of Patent: Jan. 4, 2011

(54) LOW PROFILE BLEED AIR COOLER

(75) Inventor: Bryan W. Olver, Nobleton (CA)

(73) Assignee: Pratt & Whitney Canada Corp., Longueil, Quebec (CA)

( * ) Notice: Subject to any disclaimer, the term of this patent is extended or adjusted under 35 U.S.C. 154(b) by 915 days.

(21) Appl. No.: 11/743,935

(22) Filed: May 3, 2007

(65) Prior Publication Data

US 2008/0271433 A1 Nov. 6, 2008

(51) Int. Cl.
*F01D 25/00* (2006.01)

(52) U.S. Cl. .................. 415/169.1; 415/177; 60/226.1

(58) Field of Classification Search .............. 415/108, 415/144, 169.1, 177, 178, 179
See application file for complete search history.

(56) References Cited

U.S. PATENT DOCUMENTS

| | | | |
|---|---|---|---|
| 2,474,258 A | 6/1949 | Kroon | |
| 2,696,712 A | 12/1954 | Lewis | |
| 3,475,906 A | 11/1969 | Madelung | |
| 3,797,561 A | 3/1974 | Clark et al. | |
| 3,842,597 A | 10/1974 | Ehrich | |
| 4,151,710 A | 5/1979 | Griffin et al. | |
| 4,187,675 A | 2/1980 | Wakeman | |
| 4,254,618 A | 3/1981 | Elovic | |
| 4,357,796 A | 11/1982 | Ellis | |
| 4,903,760 A | 2/1990 | Joshi et al. | |
| 4,914,904 A * | 4/1990 | Parnes et al. | 60/226.1 |
| 5,002,121 A | 3/1991 | von Erichsen | |
| 5,123,242 A * | 6/1992 | Miller | 60/226.1 |
| 5,268,135 A | 12/1993 | Sasaki et al. | |
| 5,269,133 A | 12/1993 | Wallace | |
| 5,284,012 A | 2/1994 | Laborie et al. | |
| 5,297,386 A | 3/1994 | Kervistin | |
| 5,351,476 A | 10/1994 | Laborie et al. | |
| 5,729,969 A * | 3/1998 | Porte | 60/226.1 |
| 5,806,793 A | 9/1998 | Brossier et al. | |
| 5,823,250 A | 10/1998 | Barten et al. | |
| 5,860,471 A | 1/1999 | Perryment et al. | |
| 6,092,360 A | 7/2000 | Hoag et al. | |
| 6,134,880 A | 10/2000 | Yoshinaka | |
| 6,430,931 B1 * | 8/2002 | Horner | 60/785 |
| 6,651,929 B2 | 11/2003 | Dionne | |
| 7,013,636 B2 | 3/2006 | Iya et al. | |
| 7,607,308 B2 * | 10/2009 | Kraft et al. | 60/785 |
| 2003/0127218 A1 | 7/2003 | Sears et al. | |
| 2006/0042225 A1 | 3/2006 | Bruno et al. | |
| 2008/0230651 A1 * | 9/2008 | Porte | 244/118.5 |

FOREIGN PATENT DOCUMENTS

| | | |
|---|---|---|
| EP | 0469825 A | 2/1992 |
| EP | 0 511 770 A1 | 11/1992 |
| EP | 0743434 A | 11/1996 |
| EP | 0743435 A | 11/1996 |
| FR | 2891313 A | 3/2007 |

OTHER PUBLICATIONS

European Search Report dated Nov. 19, 2008 on Applicant's corresponding European Patent Application.

* cited by examiner

*Primary Examiner*—Edward Look
*Assistant Examiner*—Ryan H Ellis
(74) *Attorney, Agent, or Firm*—Ogilvy Renault LLP (57) ABSTRACT

A bleed air cooler assembly of a gas turbine engine comprises a cooler body defining a fluid passage therein and a connector detachably affixed with the cooler body installed in an annular bypass air passage.

15 Claims, 12 Drawing Sheets

LOW PROFILE BLEED AIR COOLER

TECHNICAL FIELD

The invention relates generally to a gas turbine engine and more particularly, to an improved bleed air cooler assembly for cooling compressed bleed air in a gas turbine engine.

BACKGROUND OF THE ART

An aircraft gas turbine engine produces compressed air to be delivered to a combustor for combustion. Compressed air bled from the main source is delivered to various locations for other applications. For example, some aircraft require bleed air to be delivered to pressurize the aircraft cabin. In such a case, the bleed air, which has a relatively high temperature, must be cooled to a comfortable level for the passengers in the aircraft cabin. The compressed bleed air may be cooled outside of the gas turbine engine before it is introduced to the aircraft cabin. However, it is desirable to have such compressed bleed air cooled within the gas turbine engine.

Accordingly, there is a need to provide an improved bleed air cooling for a gas turbine engine.

SUMMARY

In one aspect, there is provided a bleed air cooler assembly for cooling compressed bleed air in an outer bypass duct of a gas turbine engine which comprises a cooler body defining a fluid passage within the cooler body and having a low profile for being positioned in an annulus between the outer bypass duct and a gas generator case; and a connector detachably affixed to the cooler body and having an inlet and an outlet in fluid communication with the fluid passage of the cooler body, the connector adapted to be detachably supported within the annulus to allow the compressed bleed air from a compressed air plenum within the gas generator case to be introduced through the inlet and to be cooled in the fluid passage of the cooler body and to then be discharged out of the outer bypass duct through the outlet In another aspect, there is provided a kit for a bleed air cooler assembly to be selectively installed in an annulus between an outer bypass duct and a gas generator case of a gas turbine engine which comprises a cooler body defining a fluid passage within the cooler body and having a low profile permitting positioning of same within the annulus; a connector detachably affixed to the cooler body to form the bleed air cooler assembly, the connector having an inlet and an outlet in fluid communication with the fluid passage of the cooler body, the connector with the cooler body adapted to be selectively installed in one of first and second locations in the annulus, aligning with an aperture defined in the outer bypass duct in each of the locations, to allow the compressed bleed air from a compressed air plenum within the gas generator case to be introduced through the inlet and to be cooled in the fluid passage of the cooler body and to then be discharged out of the outer bypass duct through the outlet; and a spacer defining a fluid passage having an inlet and an outlet and extending through the spacer, the spacer adapted to be selectively installed in the other of the first and second locations in the annulus, aligning with the aperture defined in the outer bypass duct in each of the locations, to allow the compressed bleed air from the compressed air plenum within the gas generator case to flow through the fluid passage of the spacer out of the outer bypass duct, without being cooled.

In a further aspect, there is provided a method for installing a bleed air cooler assembly in an annulus between an outer bypass duct and a gas generator case of a gas turbine engine which comprises: (a) providing a low profile bleed air cooler assembly; (b) inserting the bleed air cooler assembly into the annulus from an aft opening of the outer bypass duct, to align a connecting portion of the assembly with an aperture defined in the outer bypass duct, thereby allowing an outlet of the assembly to be connected to an external tube out of the outer bypass duct and to allow an inlet of the assembly to be connected to a compressed air plenum within the gas generator case; and (c) securing the connecting portion of the assembly to at least the gas generator case.

Further details of these and other aspects will be apparent from the detailed description and figures included below.

DESCRIPTION OF THE DRAWINGS

Reference is now made to the accompanying figures, in which.

DETAILED DESCRIPTION OF THE PREFERRED EMBODIMENTS

Figure 1:
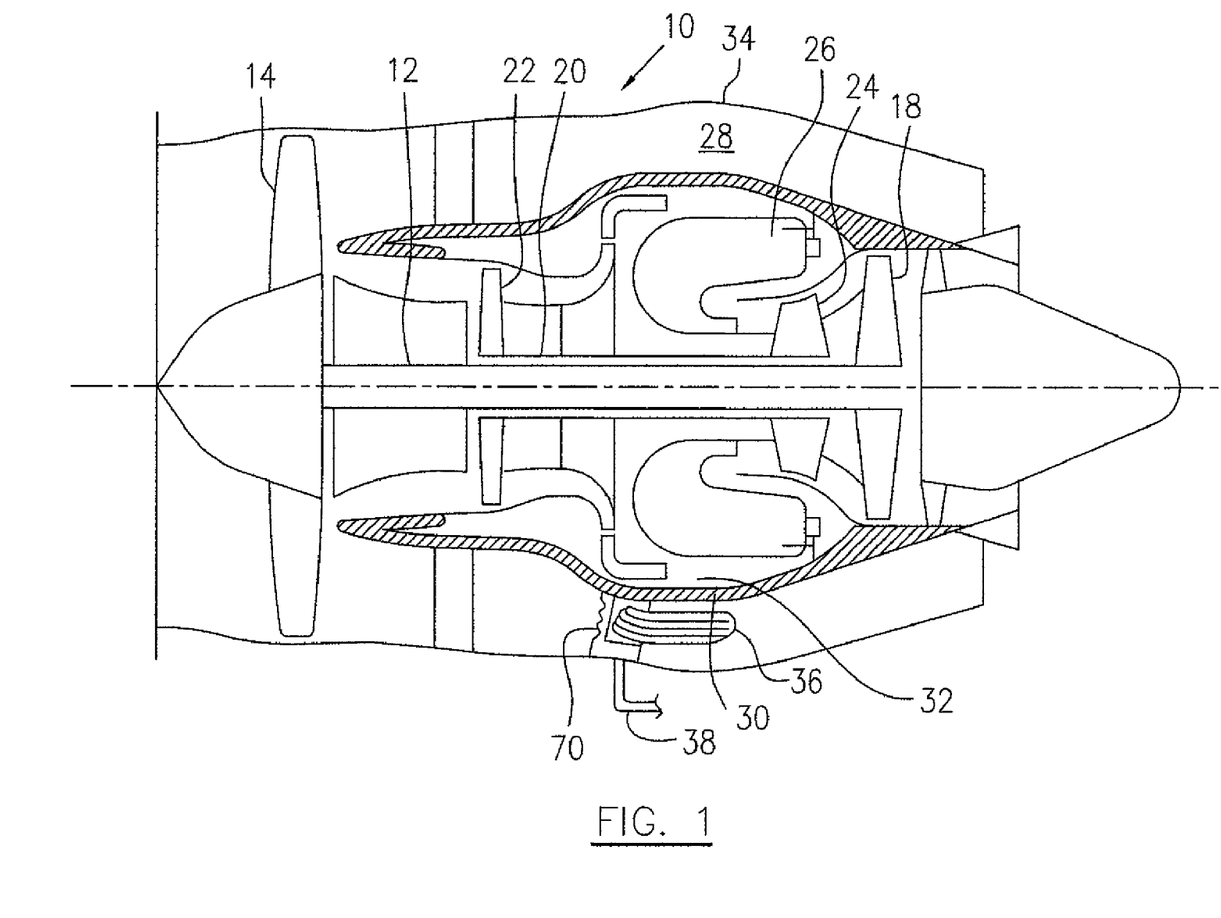
FIG. 1 is a schematic cross-sectional view of a turbofan gas turbine engine.

FIG. 1 illustrates an example gas turbine engine 10 which includes an outer bypass duct 34, a gas generator case 30, a low pressure spool assembly seen generally at 12 which includes a fan assembly 14 and a low pressure turbine assembly 18, and a high pressure spool assembly seen generally at 20 which includes a high pressure compressor assembly 22 and a high pressure turbine assembly 24. The gas generator case 30 surrounds the low and high pressure spool assemblies 12 and 20 in order to define a main fluid path (not indicated) therethrough, including a combustor 26. The bypass duct 34 and the gas generator case 30 in combination define an annular bypass passage 28 for directing a bypass airflow therethrough. A plurality of aerodynamic fairings 70 cross the bypass passage 28, to allow services such as oil and bleed air to communicate with systems outside the engine, as will be discussed further below.

Reference is now made to FIGS. 1, 2A, 2B and 2C. The gas generator case 30 accommodates the combustor 26 and defines an annular compressed air plenum 32 surrounding the combustor 26 and for receiving compressed air from the high pressure compressor 22. The outer bypass duct 34 is positioned co-axially to the gas generator case 30 and therefore defines the annular bypass passage 28 therebetween. A bleed air cooler assembly 36 is installed within the annular bypass passage 28 in a first location to allow compressed bleed air from the compressed air plenum 32 to be cooled by the bypass airflow when the compressed bleed air flows through the bleed air cooler assembly 36 and to be then discharged into an external bleed air supply tube 38. The bleed air supply tube 38 leads to, for example, inside the cabin of an aircraft to which the engine is mounted. A spacer 40 is also positioned within the annular bypass passage 28 in a second location to allow compressed bleed air from the annular compressed air plenum 32 to be directed through the spacer 40 into another connected external bleed air supply tube similar to the bleed air supply tube 38, to, for example, other locations of the aircraft for a different purpose. The bleed air through the spacer 40 is not substantially cooled by the bypass flow and maintains relatively high temperatures. This high temperature bleed air can be used, for example, to melt ice on the aircraft parts exposed to cold weather.

Figure 2A:
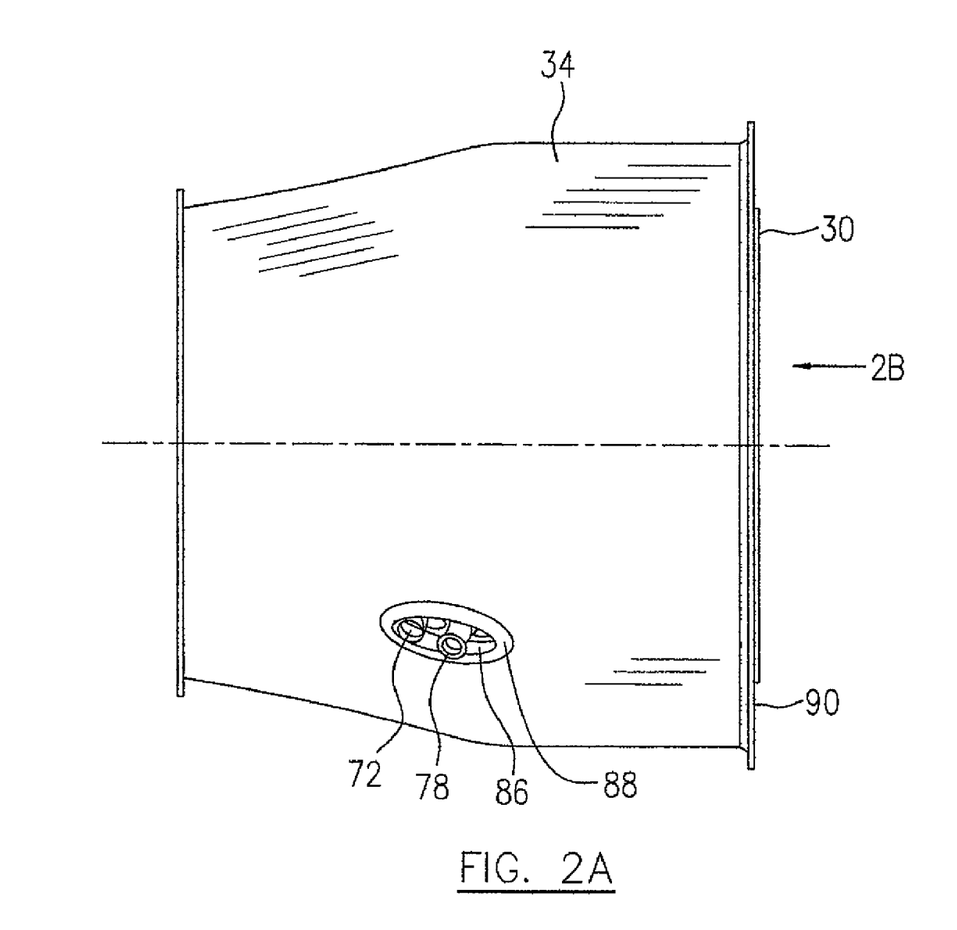
FIG. 2A is a partial side elevational view of the gas turbine engine of FIG. 1, showing an outer bypass duct of the engine.
Figure 2B:
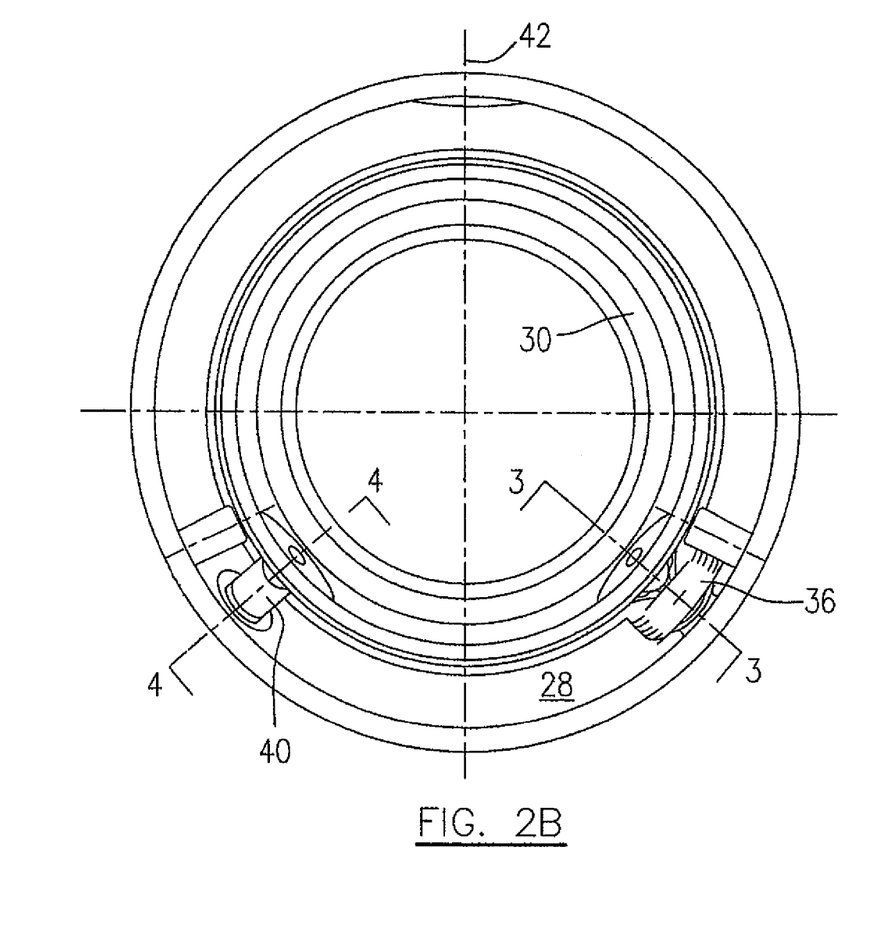
FIG. 2B is a rear elevational view of an outer bypass duct and gas generator case assembly viewed from a direction indicated by arrow 2B in FIG. 2A, with the rotor and combustor of the engine removed, showing the bleed air cooler assembly and spacer positioned in first and second locations within an annulus defined between the outer bypass duct and the gas generator case, according to one embodiment.
Figure 2C:
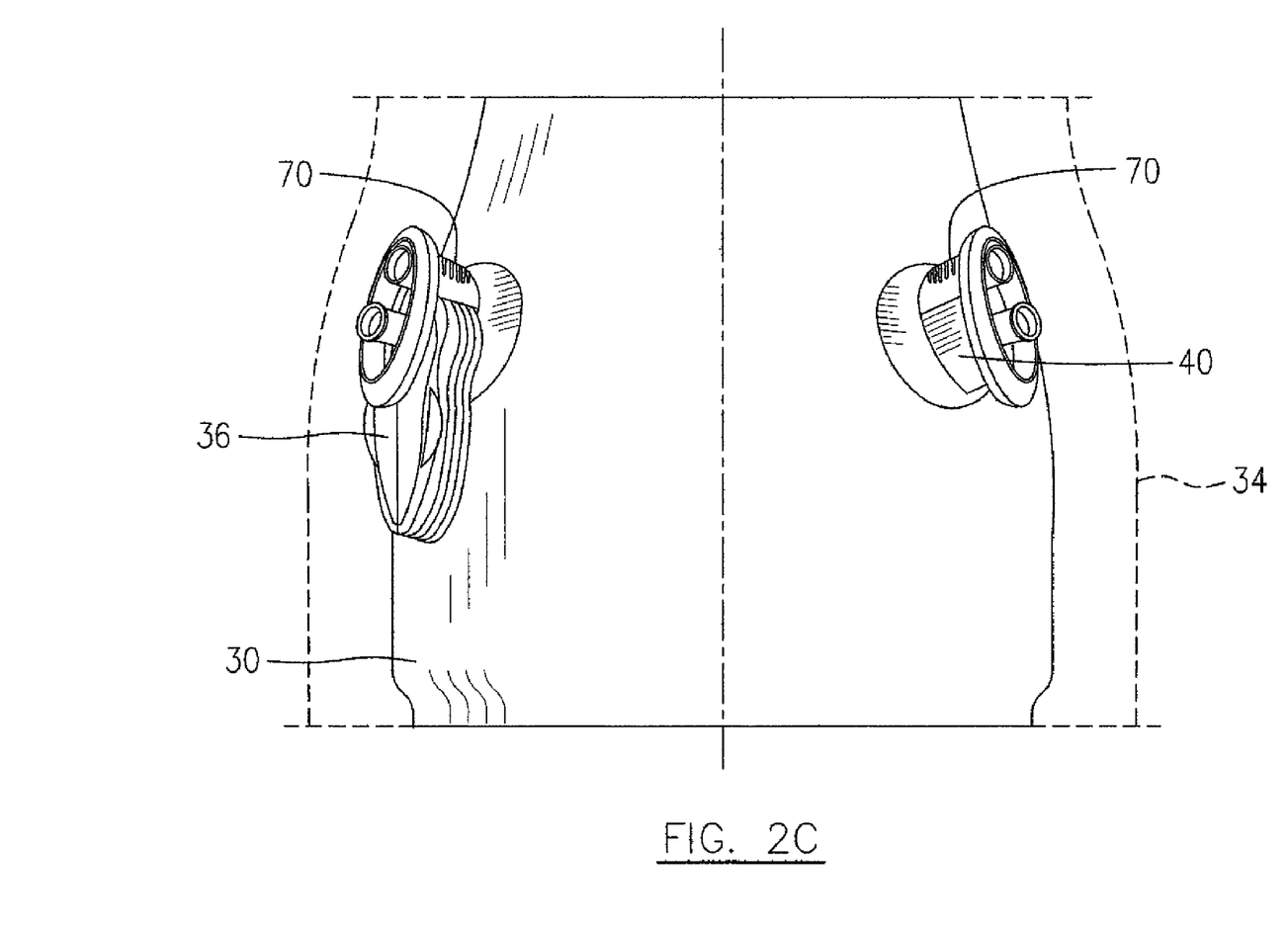
FIG. 2C is a plan view of FIG. 2B, with the outer bypass duct removed and shown in broken lines.

The bleed air cooler assembly 36 and the spacer 40 are positioned at respective right and left sides of the engine as shown in FIG. 2B, and these positions may need to be exchanged, depending on a right hand engine mounting position or a left hand engine mounting position to the aircraft. Therefore, it is optional that the bleed air cooler assembly 36 and the spacer 40 are interchangeable in positions of installation in the annular bypass passage 28 of the engine. It should be noted that the bleed air cooler assembly 36 can be axially positioned in any location within the annular bypass passage 28. In one embodiment of the present invention, the axial location of the bleed air cooler assembly 36 is on the top of the P3 air bleed boss on the gas generator case 30 (this will be further described hereinafter with reference to FIG. 3), in order to avoid additional ducting.

In FIGS. 3, 5-7 and 9, the bleed air cooler assembly 36 according to one embodiment of the present invention may include a cooler body 44 defining a fluid passage within the cooler body 44. The fluid passage is represented by spaces 46, 48 and aperture 50. The cooler body 44 presents a low profile permitting to be positioned within the annular bypass passage 28 of the engine. The bleed air cooler assembly 36 further includes a connector 52 detachably affixed to the cooler body 44 and having an inlet 54 and an outlet 56 in fluid communication with the fluid passage of the cooler body 44. In this embodiment the cooler body 44 is formed as two halves 58, 60 of a shell defining the respective spaces 46 and 48 therein. The two halves 58 and 60 of the shell may be substantially identical and each define a mating surface at one end thereof in order to allow the two halves 58, 60 of the shell to mate together, thereby forming the cooler body 44. A portion at the respective halves 58, 60 of the shell is cut away to allow the connector 52 to be fittingly received between the two halves 58, 60 of the shell at the other end thereof.

Figure 3:
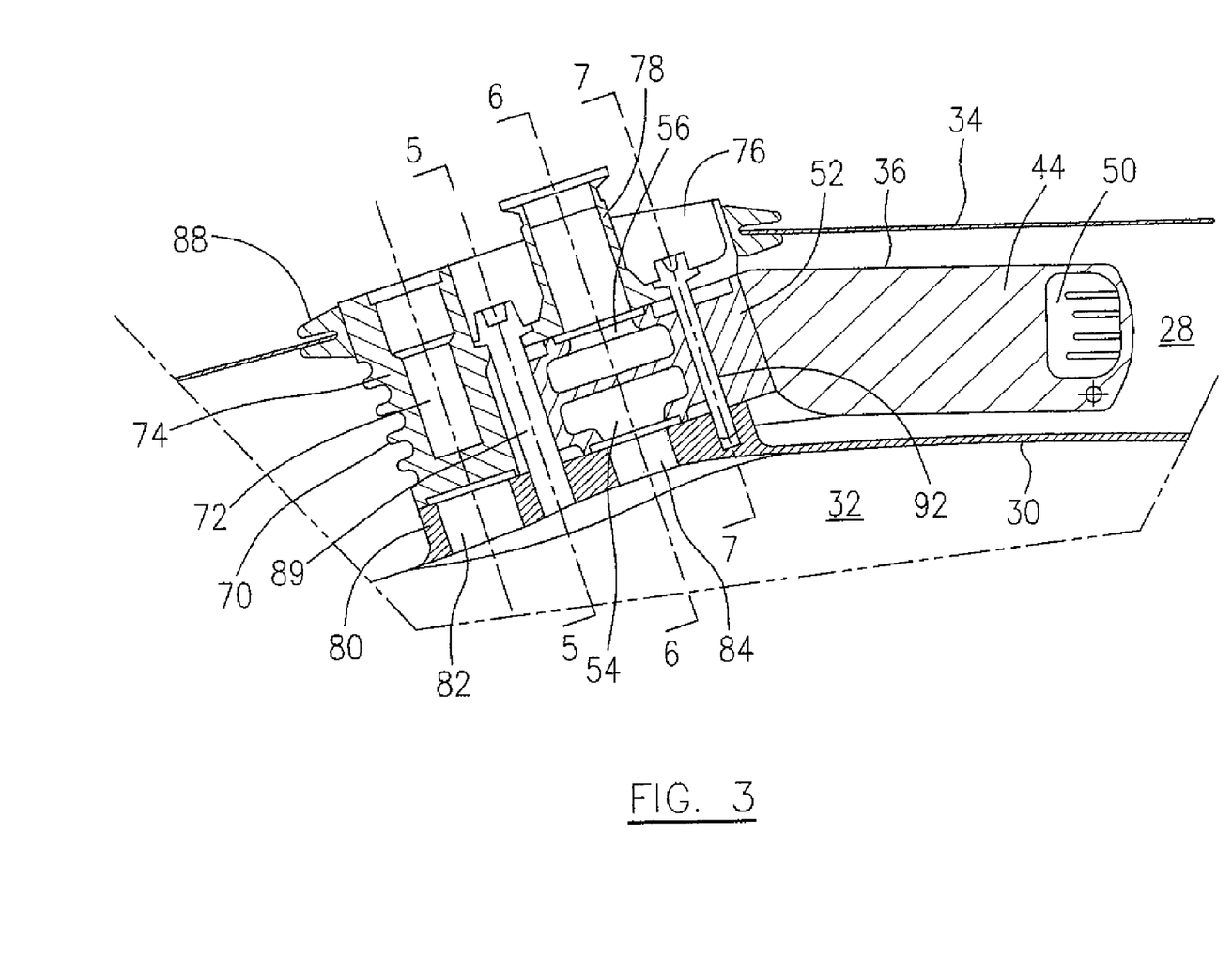
FIG. 3 is a partial cross-sectional view of the engine, taken along line 3-3 of the outer bypass duct and the gas generator case assembly shown in FIG. 2B, showing the internal configuration of the bleed air cooler assembly.
Figure 9:
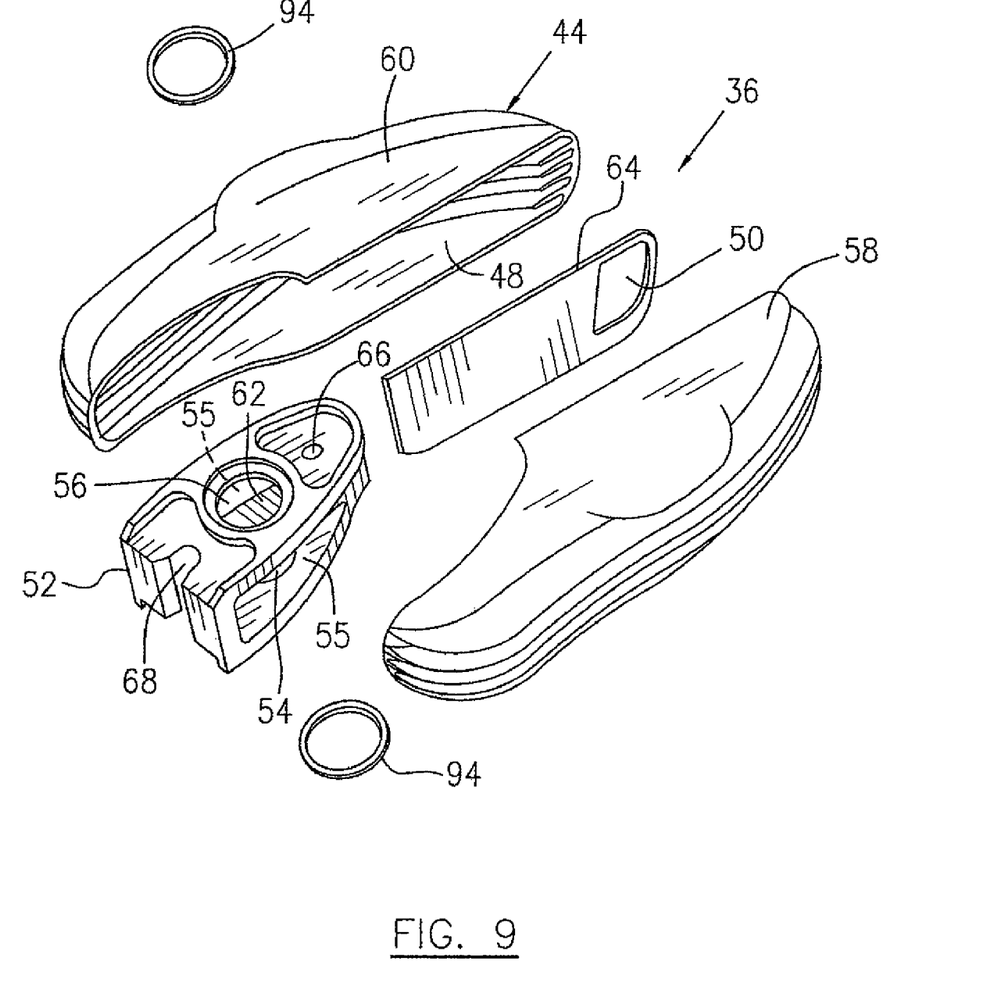
FIG. 9 is an exploded isometric view of the bleed air cooler assembly of FIG. 3, show in the lower profile of the assembly.

The inlet 54 and outlet 56 are defined in substantially parallel opposite surfaces (not indicated) of the connector 52 and are in fluid communication with apertures 55 defined in the respective opposite sides of the connector 52 (See FIG. 9). Fluid communication between the inlet 54 and outlet 56 (or between the apertures 55 defined in the respective opposite sides of the connector 52) within the connector 52 is prevented by a partition 62 (see FIGS. 6 and 9). The inlet 54 and outlet 56 are in fluid communication with the respective spaces 46, 48 within the cooler body 44 through the respective apertures 55 defined in the opposite sides of the connector 52. A partition 64 is provided and supported between the opposite mating surface of the two halves 58, 60 of the shell. The partition 64 extends between the connector 52 and the end of the cooler body 54 remote from the end to which the connector 52 is affixed, and defines the aperture 50 at the remote end (as shown in FIGS. 3 and 9), to allow the space 46 and 48 within the respective two halves 58, 60 of the shell to be in fluid communication only through this remote end with respect to the connector 52. Therefore, bleed air can be introduced from inlet 54 to flow through space 46, aperture 50, space 48 and to then be discharged through outlet 56.

The two halves 58 and 60 of the shell provide a large contact area to both the hot bleed air flowing through the inside of the cooler body 44 and to the relatively cool bypass air flowing within the annular bypass passage 28 for heat exchange. For a better heat exchange result, a plurality of fins may be provided to the two halves 58, 60 of shell at both inside and outside thereof. The bleed air cooler assembly 36 may be fastened together by fasteners such as screws which are not shown. The connector 52 also defines a mounting hole 66 and a mounting recess 68 at a front end thereof for receiving fasteners to mount the bleed air cooler assembly 36 to the engine.

In addition to compressed bleed air passages needed to radially cross the annular bypass air passages 28 there are also oil passages to extend across the annular bypass air passage 28 to connect components of an oil system of the engine located outside of the housing or nacelle 10, such as oil pumps, oil reservoirs, etc. and internal components of the engine which need to be cooled and lubricated by oil such as bearing chambers, etc. In this embodiment, a fairing member 70 (see FIG. 3) is provided to define an oil passage 72 extending therethrough. The fairing member 70 substantially has an L-shaped configuration in a side elevational view, including a radial portion 74 defining the oil passage 72 for receiving an oil supply and return transfer tube to be connected thereto, and an axial portion 76 extending from the radial portion 74. A bleed air supply tube connector 78 may be integrated with the axial portion 76, projecting radially out of the axial portion 76 for connection with, for example, the external bleed air supply tube 38 (see FIG. 1). The fairing member 70, particularly the front and opposite sides of the radial portion 74, is configured in curvatures for aerodynamic fairing purposes in order to reduce flow resistance when the fairing member 70 is positioned within the annular bypass air passage 28.

Reference is made to FIGS. 2A, 2B, 2C, 3, 5-7 and 9. The gas generator case 30 includes a boss 80 at each of the first and second locations for installation of the respective bleed air cooler assembly 36 and spacer 40 (see FIG. 2B). Two bores 82, 84 extend radially through each boss 80. Bore 82 which is located in a relatively front end of boss 80 is to be connected with an internal oil supply and return transfer tube (not shown). Bore 84 is in fluid communication with the compressed bleed air plenum 32 within the gas generator case 30 for introduction of compressed bleed air into the bleed air cooler assembly 36. Two relatively large apertures 86 (only one is shown in FIG. 2A) are defined in the outer bypass duct 34 in the respective first and second locations, each substantially aligning with one boss 80 and thus with bores 82 and 84 defined in the boss 80. Each of the large apertures 86 may be provided with a grommet 88 for snugly retaining the axial portion 76 of the fairing member 70, thereby positioning the fairing member 70 such that the oil passage 72 of the fairing member 70 is aligned with the bore 82 in the boss 80 of the gas generator case 30. The fairing member 70 is further retained in position by a mounting screw 89 which extends through a mounting hole (not indicated) in the axial portion 76 and is loosely engaged with a threaded hole (not indicated) in boss 80 prior to installation of the bleed air cooler assembly 36 in position.

In installation of the bleed air cooler assembly 36, the bleed air cooler assembly 36 may be inserted into the annular bypass air passage 28 from an open end 90 (see FIG. 2A). The bleed air cooler assembly 36 is positioned within the annular bypass air passage 28 such that the connector 52 is inserted radially between the axial portion 76 of the fairing member 70 and the boss 80 of the gas generator case 30, to allow the inlet 54 and outlet 56 of the connector 52 to align with both bore 84 in the boss 80 and the bleed air supply tube connector 78 of the fairing member 70 and to also allow the mounting recess 68 (see FIG. 9) in the front end of the connector 52 to receive the mounting screw 89 (mounting screw 89 has already been inserted through a mounting hole in the axial portion 76 of the fairing member 70 loosely engaged with threaded mounting hole in the boss 80 to secure the fairing member 70 in position prior to installation of the bleed air cooler assembly 36). At this stage, another mounting screw 92 is inserted through another mounting hole (not indicated) in the axial portion 76 of the fairing member 70, through mounting hole 66 of the connector (see FIG. 9) and is engaged in a threaded mounting hole (not indicated) in the boss 80 of the gas generator case 30. Both mounting screws 89 and 90 are now tightened properly such that the opposite mounting faces of the connector 52 are tightly compressed between the axial portion 76 of the fairing member 70 and the boss 80 of the gas generator case 30 and the bleed cooler assembly 36 is therefore securely installed in the annular bypass air passage 28.

After installation of the bleed air cooler assembly 36 is completed, the radial portion 74 of the fairing member 70 is positioned immediately upstream of the connector 52 and the cooler body 44 extends downstream from the connector 52. Therefore, the fairing member 70 and the bleed air cooler assembly 36 in combination provide an aerodynamic fairing profile to reduce resistance to the bypass air flow.

Seal rings 94 as indicated in FIG. 9, may be provided around the respective inlet 54 and outlet 56 on the substantially parallel opposite mounting surfaces of the connector 52, to prevent leakage of the compressed bleed air into the annular bypass air passage 28. A similar seal ring (not shown) may also be provided between the radial portion 74 of the fairing member 70 and the boss 80 of the gas generator case 30 to prevent oil leakage.

Figure 4:
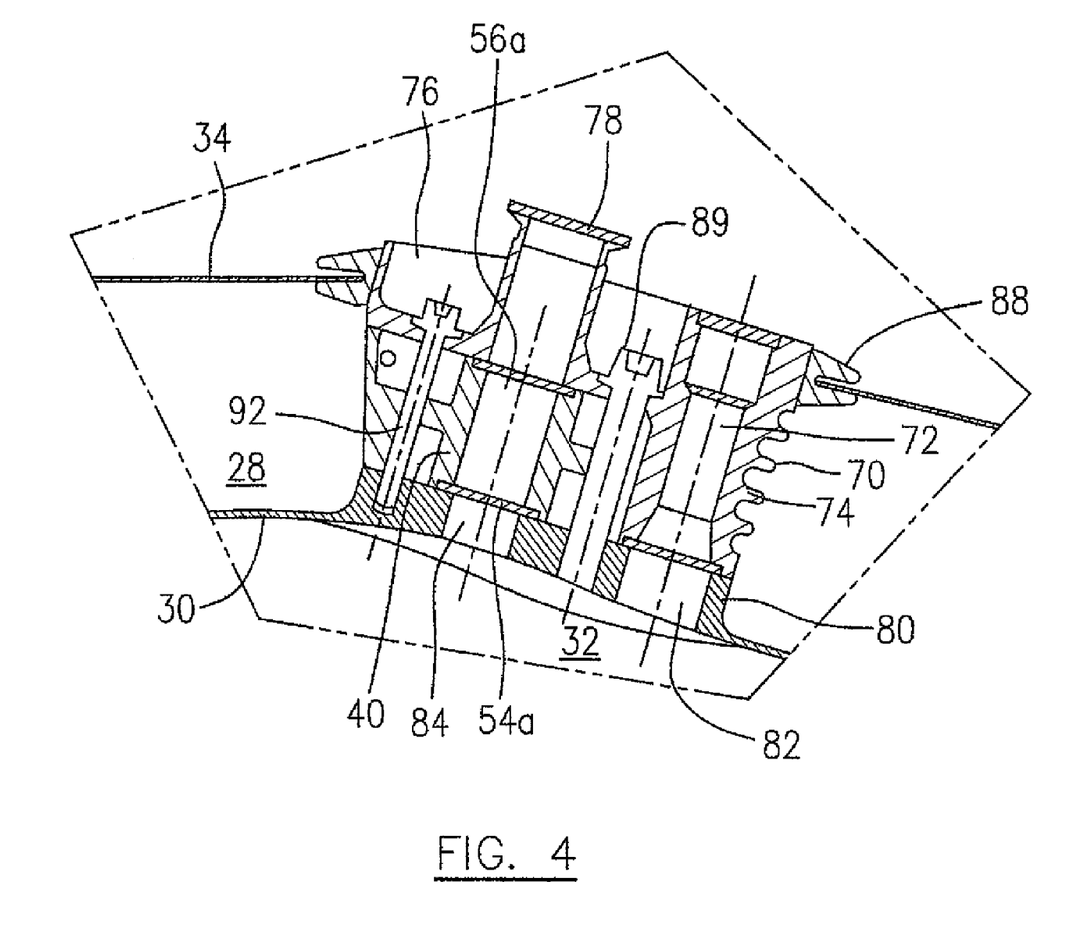
FIG. 4 is a partial cross-sectional view of the engine, taken along line 4-4 of the outer bypass duct and gas generator case assembly shown in FIG. 2B, showing the inner configuration of the spacer.
Figure 5:
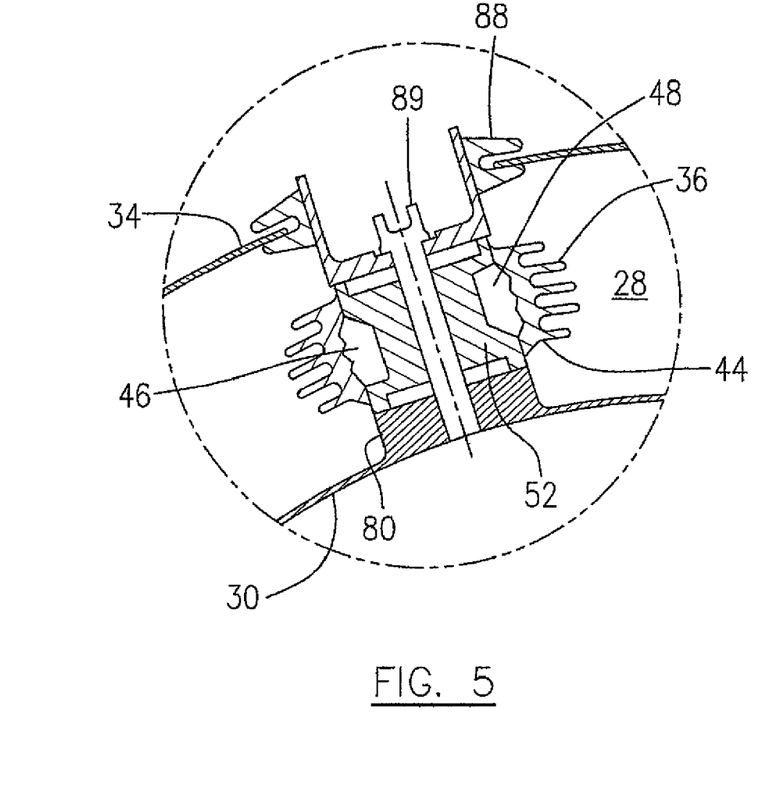
FIG. 5 is a cross-sectional view of the bleed air cooler assembly taken along line 5-5 in FIG. 3.
Figure 8:
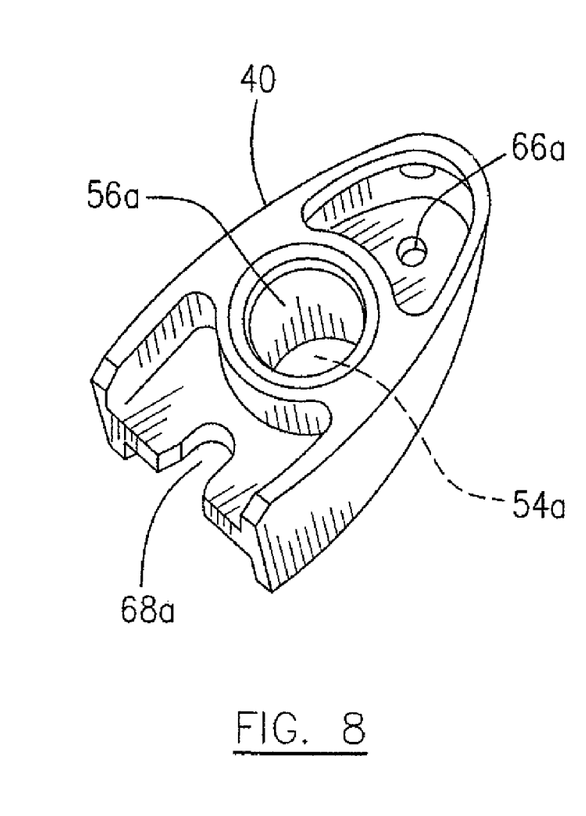
FIG. 8 is an isometric view of the spacer shown in FIG. 4, show in the profile of the spacer.

Now reference is made to FIGS. 4 and 8. The spacer 40 may have another profile similar to the outer profile of the connector 52 of FIG. 9. The spacer 40 includes inlets 54a and 56a defined in the respective substantially parallel opposite mounting surfaces of the spacer which is similar to the inlets 54 and 56 of the connector 52 but does not define apertures in the opposite sides of the spacer 40, unlike the connector 52.

Figure 6:
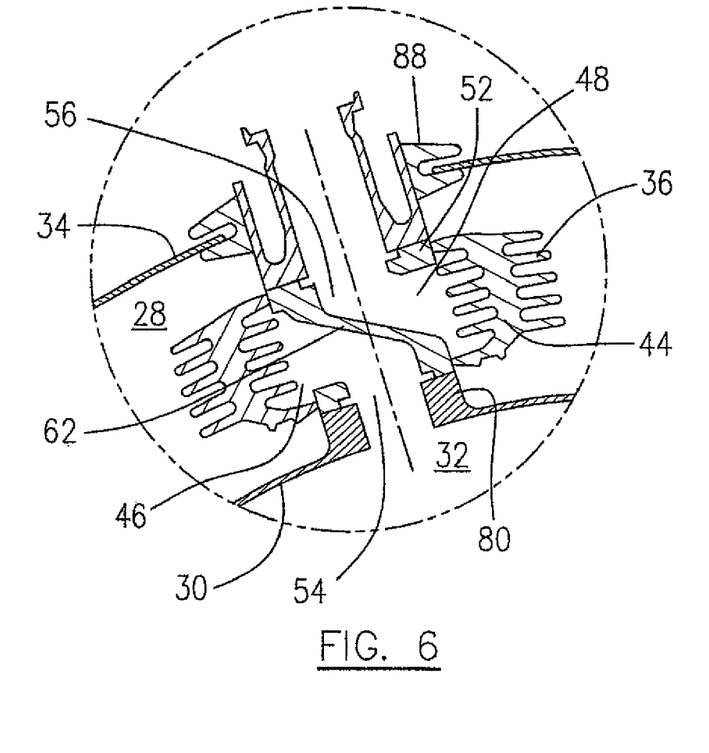
FIG. 6 is a cross-sectional view of the bleed air cooler assembly taken along line 6-6 in FIG. 3.
Figure 7:
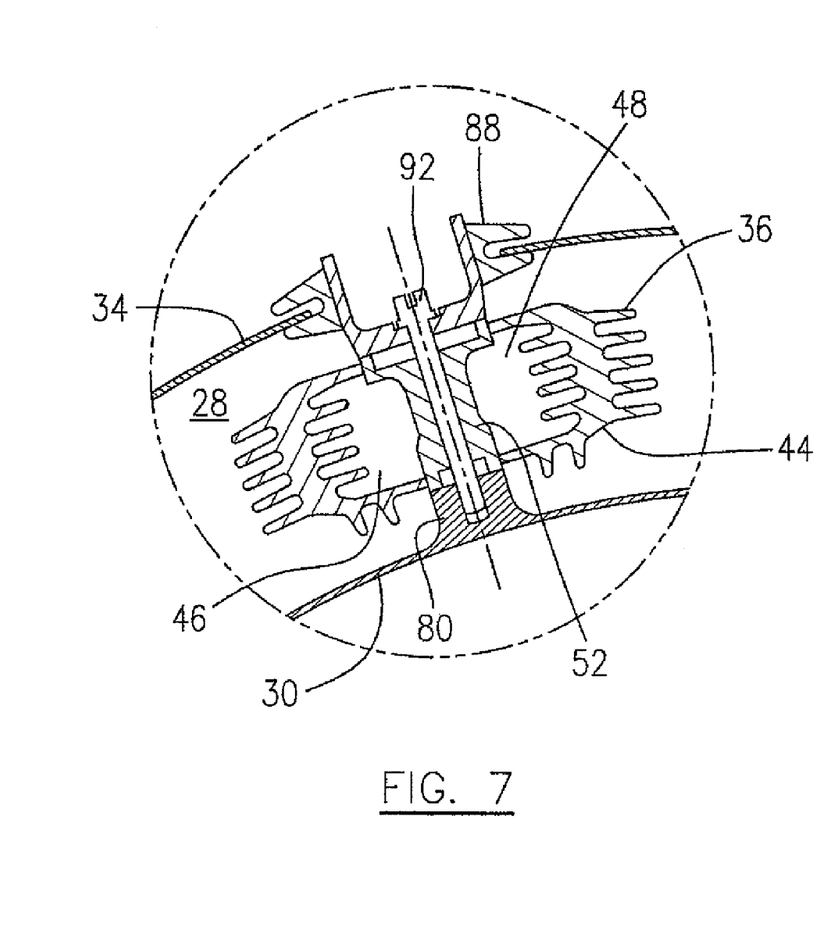
FIG. 7 is a cross-sectional view of the bleed air cooler assembly taken along line 7-7 in FIG. 3.

The spacer 40 also does not include a partition similar to the angularly positioned partition 62 of the connector 52, as shown in FIG. 6. Therefore the inlet 54a and outlet 56a of spacer 40 are in fluid communication through a hole (not indicated) extending radially through the spacer 40. The spacer 40 includes a mounting hole 66a and a mounting recess 68a similar to the mounting hole 66 and the mounting recess 68 in the connector 52 of FIG. 9. Therefore, the spacer 40 may be installed in the annular bypass air passage 28 in a manner similar to that for installing the bleed air cooler assembly 36. When the spacer 40 is installed in position as shown in FIG. 4, compressed bleed air from the compressed air plenum 32 within the gas generator case 30 is delivered through the inlet 84, through the hole extending through the spacer 40 and the outlet 56a into the bleed air supply tube connector 78 of the fairing member 70, and from there is directed by an external tube (not shown) to the components of the aircraft which, for example, require hot compressed air for anti-ice performance.

When the bleed air cooler assembly 36 or the spacer 40 needs to be removed from the engine, for example, for repair or maintenance, it can be easily done by loosening the mounting screw 89 and removing mounting screw 92 and then withdrawing the bleed air cooler assembly 36 or the spacer 40 without disturbing the oil line connection through the fairing member 70. The bleed air cooling assembly 36 or spacer 40 may also be placed back in the position (as previously described) without disturbing the oil line connection through the fairing member 70. Therefore, there is no need for an oil leakage check on the oil line connection through the fairing member 70 after either removing or installing the bleed air cooler assembly 36 or spacer 40. It is also allows interchange ability between the left- and right-installation positions of the bleed air cooler assembly 36 and spacer 40, depending on whether the engine is to be installed in a left- or a right-hand mounting position in a twin-engine aircraft. This option allows fewer-parts-count engine for use in twin-engine aircraft, by obviating the need to provide specific left- and right-configurations for the engine. Rather, a generic engine configuration may be provided, and the interchangeability of the cooler and spacer allow the assembler to determine whether a left- or right-hand engine will be provided during assembly, based on which parts are installed where.

It should be understood that the cooler body may be configured differently from the embodiments illustrated and described above, but a low profile configuration is preferably maintained in order to allow the assembly to be positioned within the annular bypass air passage of the engine and yet provides adequate cooling performance. In addition to means such as inner and outer fins for increasing heat exchanging surfaces, it is optional to have the cooler body and thus the entire bleed air cooler assembly smaller in a radial direction of the engine than other dimensions of the assembly in respect of the longitudinal and circumferential directions of the engine. For example, instead of having the cooler body extending downstream in the annular bypass air passage to increase the length of the internal fluid passage in the cooler body as described in the embodiment of the present invention, the cooler body may extend circumferentially within the annular bypass air passage of the engine in one or both circumferential directions. For example, one of such embodiments is further described below.

Figure 10:
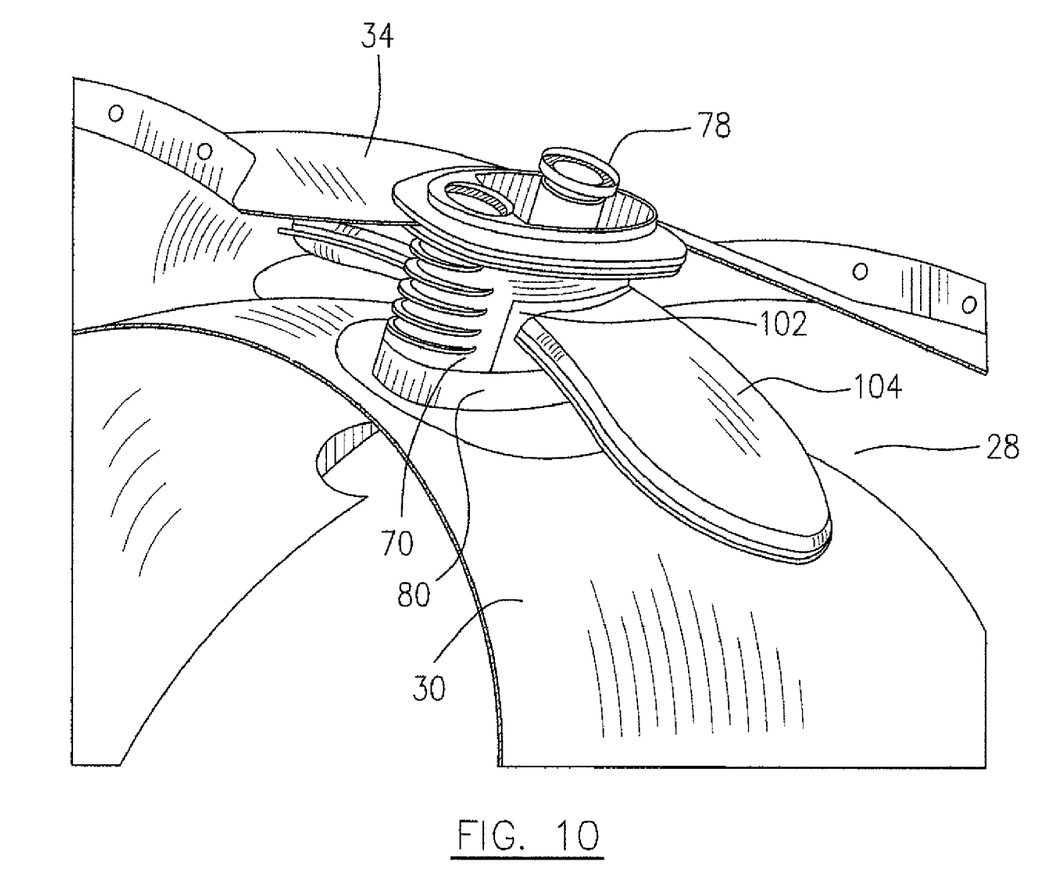
FIG. 10 is a partial isometric view of the gas turbine engine, with a portion of the outer bypass duct cut away to show another embodiment.
Figure 11:
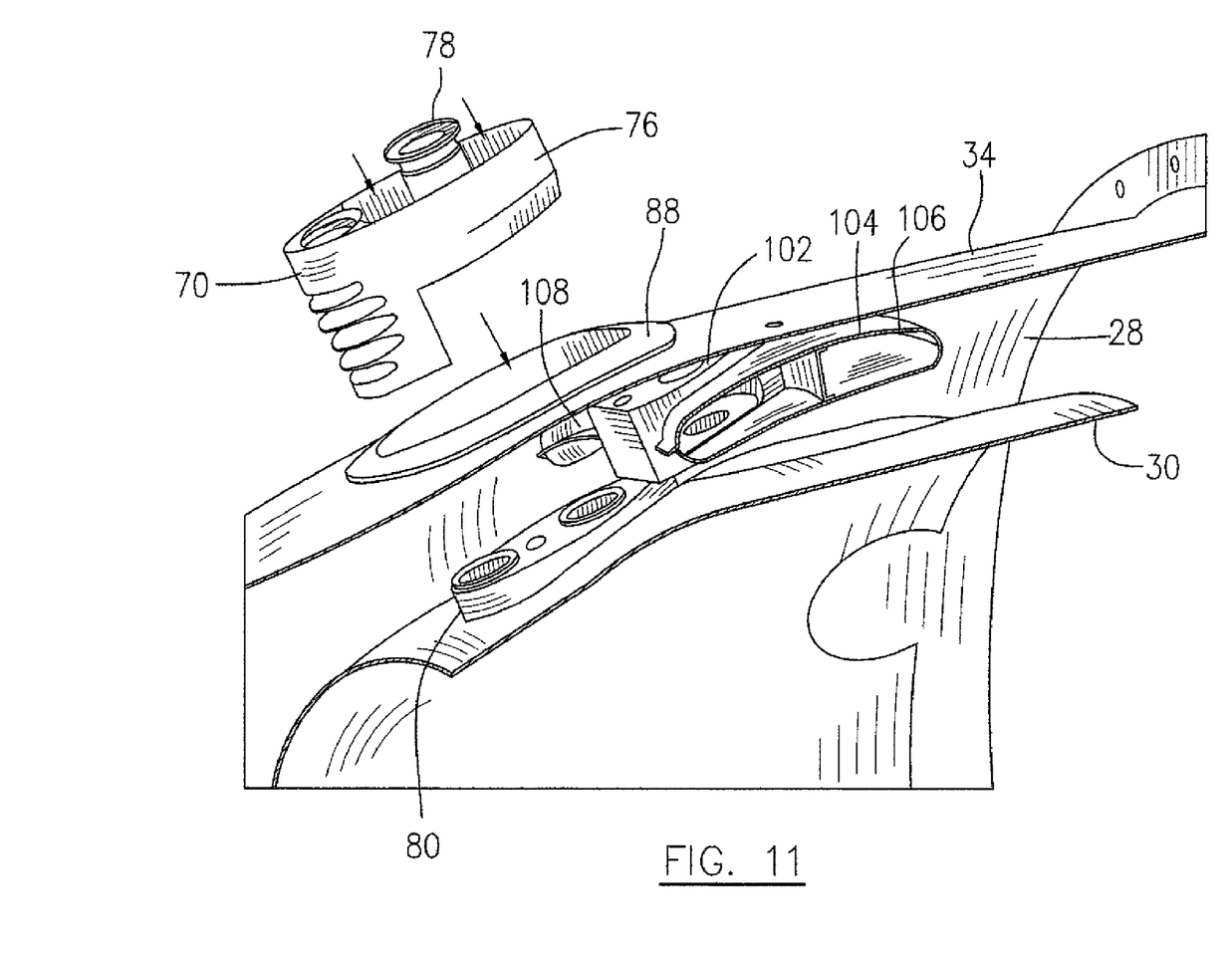
FIG. 11 is an exploded isometric view of the embodiment of FIG. 10, with a portion of one wing of a cooler body cut and removed to show the internal configuration of the cooler body.
Figure 12:
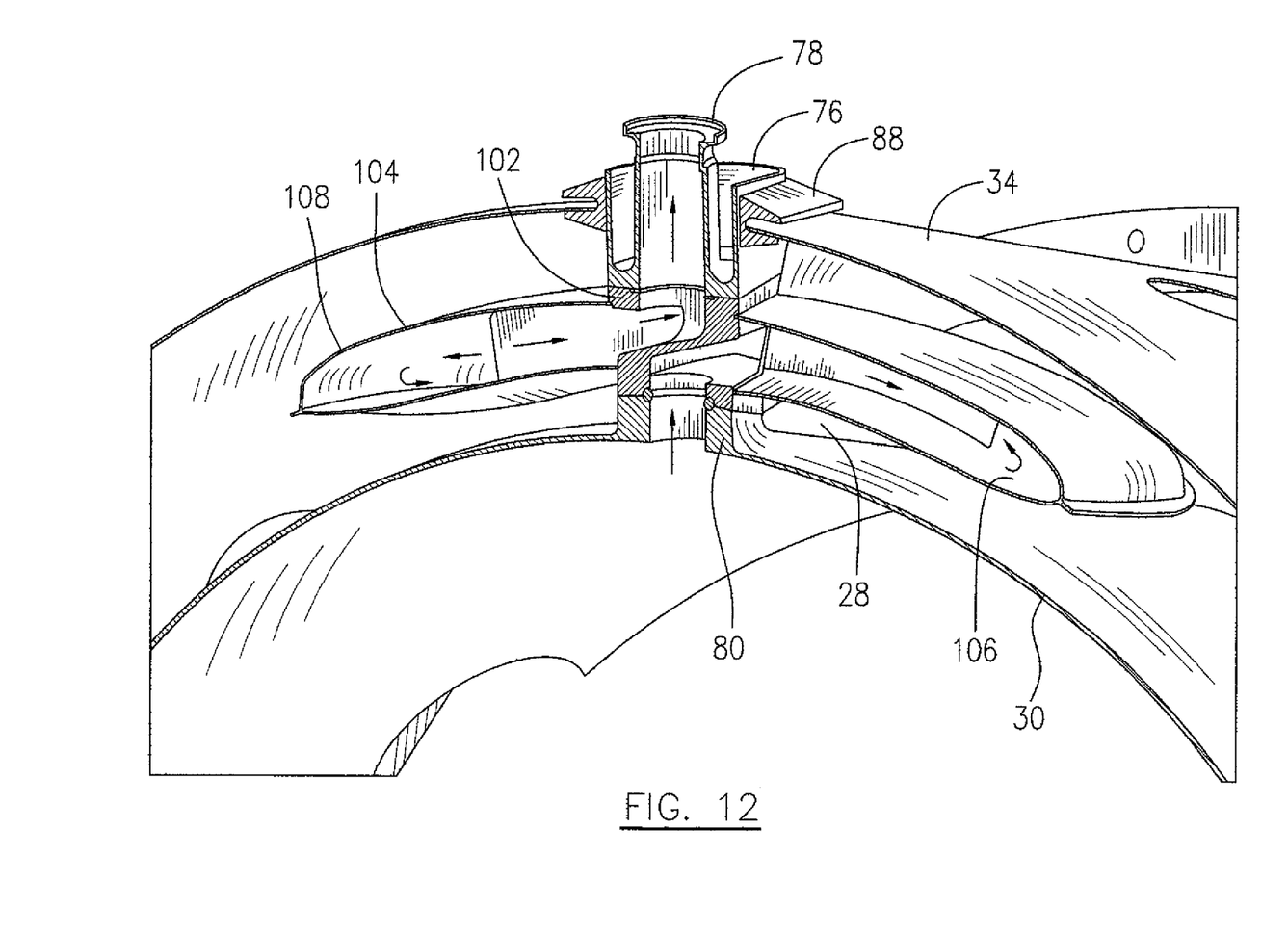
FIG. 12 is a partial isometric view of the embodiment of FIG. 10, showing a radial cross-section of the embodiment.

Referring to FIGS. 10-12, a bleed air cooler assembly 100, similar to the bleed air cooler assembly 36 of FIG. 9, includes a connector 102 and a cooler body 104. The connector 102 has a profile generally similar to the profile of connector 52 of FIG. 9 and the spacer 40 and therefore, the bleed air cooler assembly 100 may be interchangeable with either the bleed air cooler assembly 36 or spacer 40. The cooler body 104 includes two wings 106, 108 extending circumferentially oppositely form the connector 102 within the annular bypass air passage 28. Each of the wings 106, 108 is hollow and has a partition 110 to divide the inside of wing 106 (or 108) into first and second air passages (not indicated). The connector 102 has an inlet/outlet configuration similar to the connector 52 whereby the first air passages of the wings 106, 108 are in fluid communication with the respective inlet and outlet (not indicated) of the connector 102. The second air passages of the wings 106, 108, which are in fluid communication with the respective first air passages at the free end of the wings 106, 108, are connected directly to each other an din fluid communication. Therefore, bleed air can be introduced into the assembly 100 through the wings 106, 108 as shown by the arrows in FIG. 12. The arrows in FIG. 11 illustrate the way of installation. Other features are similar to the embodiment previously described and will not be repeated herein.

The above description is meant to be exemplary only, and one skilled in the art will recognize that changes may be made to the embodiments described without departure from the scope of the invention disclosed. For example, the cooler body and connector of the bleed air cooler assembly may be made from any suitable materials providing appropriate thermal conductivity and mechanical strength. Still other modifications which fall within the scope of the present invention will be apparent to those skilled in the art, in light of a review of this disclosure, and such modifications are intended to fall within the appended claims.

The invention claimed is:

1. A bleed air cooler assembly for cooling compressed bleed air in an outer bypass duct of a gas turbine engine, comprising:
  a cooler body defining a fluid passage within the cooler body and having a low profile for being positioned in an annulus between the outer bypass duct and a gas generator case; and
  a connector detachably affixed to one end of the cooler body and having an inlet and an outlet on opposite surfaces of the connector and in fluid communication with the fluid passage of the cooler body, the connector adapted to be detachably supported within the annulus to allow the compressed bleed air from a compressed air plenum within the gas generator case to be introduced through the inlet and to be cooled in the fluid passage of the cooler body and to then be discharged out of the outer bypass duct through the outlet.

2. The assembly as defined in claim 1 wherein the cooler body comprises a partition positioned within a cavity defined in the cooler body, the partition dividing the cavity into first and second sections, the first and second sections in fluid communication with each other and with the respective inlet and outlet to form the fluid passage of the cooler body.

3. The assembly as defined in claim 2 wherein the cooler body comprises two halves of a shell.

4. The assembly as defined in claim 2 wherein the cooler body comprises a plurality of fin members extending both inwardly into the cavity and outwardly into the annulus.

5. The assembly as defined in claim 1 wherein the first and second sections of the cavity are in fluid communication with each other at a distal end of the cooler body with respect to the connector.

6. The assembly as defined in claim 1 wherein the bleed air cooler assembly has a dimension in a radial direction of the engine which is smaller than dimensions of the assembly in respective longitudinal and circumferential directions of the engine.

7. A kit for a bleed air cooler assembly to be selectively installed in an annulus between an outer bypass duct and a gas generator case of a gas turbine engine, comprising:
  a cooler body defining a fluid passage to be positioned within the annulus;
  a connector detachably affixed to the cooler body to form the bleed air cooler assembly, the connector having an inlet and an outlet in fluid communication with the fluid passage of the cooler body, the connector with the cooler body adapted to be selectively installed in one of first and second locations in the annulus, aligning with an aperture defined in the outer bypass duct in each of the locations, to allow the compressed bleed air from a compressed air plenum within the gas generator case to be introduced through the inlet and to be cooled in the fluid passage of the cooler body and to then be discharged out of the outer bypass duct through the outlet; and
  a spacer defining a fluid passage having an inlet and an outlet and extending through the spacer, the spacer adapted to be selectively installed in the other of the first and second locations in the annulus, aligning with the aperture defined in the outer bypass duct in each of the locations to allow the compressed bleed air from the compressed air plenum within the gas generator case to flow through the fluid passage of the spacer out of the outer bypass duct, without being cooled.

8. The kit as defined in claim 7 wherein the spacer and the connector have a similar outer profile.

9. The kit as defined in claim 8 wherein the fairing member comprises a radial portion defining the oil passage, and an axial portion extending from the radial portion for mating with an outer surface of the selectively installed one of the bleed air cooler assembly and the spacer, a bleed air supply tube affixed in the axial portion of the fairing member adapted for aligning with the outlet of the selectively installed one of the bleed air cooler assembly and the spacer.

10. The kit as defined in claim 9 further comprising two halves of a shell to be joined to form the cooler body.

11. The kit as defined in claim 7 further comprising at least one fairing member adapted to be installed in the aperture defined in the outer bypass duct in either the first or the second locations, the fairing member extending into the annulus upstream of the selectively installed one of the bleed air cooler assembly and the spacer, the fairing member defining an oil passage extending through the faring member to be connected with an oil system of the engine, for directing an oil flow radially through the annulus.

12. The kit as defined in claim 7 further comprising a partition to be positioned within a cavity of the cooler body to divide the cavity into two sections in fluid communication with each other, thereby forming the fluid passage defined in the cooler body.

13. A method for installing a bleed air cooler assembly in an annulus between an outer bypass duct and a gas generator case of a gas turbine engine, comprising:
  a) providing a low profile bleed air cooler assembly;
  b) inserting the bleed air cooler assembly into the annulus from an aft opening of the outer bypass duct, to align a connecting portion of the assembly with an aperture defined in the outer bypass duct, thereby allowing an outlet of the assembly to be connected to an external tube out of the outer bypass duct and to allow an inlet of the assembly to be connected to a compressed air plenum within the gas generator case; and c) securing the connecting portion of the assembly directly to at least the gas generator case.

14. The method as defined in claim 13 wherein the connecting portion of the assembly is positioned in coordination with a fairing member located within the aperture defined in the outer bypass duct, the fairing member defining an oil flow connection extending radially through the annulus and defining an outlet extension with respect to the outlet of the assembly.

15. The method as defined in claim 14 wherein the connecting portion of the assembly is positioned axially behind a radial portion of the fairing member and radially between a mounting surface of the gas generator case and an axial portion extending rearwardly from the radial portion of the fairing member, aligning the inlet of the assembly with an aperture defined in the gas generator case and aligning the outlet of the assembly with the outlet extension of the axial portion of the fairing member.

* * * * *